United States Patent [19]

Korbell

[11] 4,401,939
[45] Aug. 30, 1983

[54] ALTERNATOR HAVING STATOR CARRYING BOTH FIELD AND ARMATURE WINDINGS

[75] Inventor: George K. Korbell, Euclid, Ohio

[73] Assignee: Sheller-Globe Corporation, Cleveland, Ohio

[21] Appl. No.: 259,514

[22] Filed: May 1, 1981

[51] Int. Cl.³ .................. H02K 3/00; H02K 11/00; H02P 9/46
[52] U.S. Cl. ......................... 322/59; 310/168; 310/184; 322/47; 322/73
[58] Field of Search .................. 322/47–50, 322/89, 90, 95, 96, 59, 63, 72, 73; 310/168, 184

[56] References Cited

U.S. PATENT DOCUMENTS

| | | | |
|---|---|---|---|
| 2,708,733 | 5/1955 | MacFarlane et al. | 322/50 |
| 3,157,810 | 11/1964 | Adkins | 310/168 |
| 3,173,076 | 3/1965 | Adkins | 322/47 |
| 3,512,026 | 5/1970 | Tiltins | 310/168 |
| 3,866,110 | 2/1975 | Ruggeri | 322/63 X |
| 4,075,521 | 2/1978 | Nordebo | 310/184 |
| 4,218,645 | 8/1980 | Kirsch et al. | 310/168 X |

OTHER PUBLICATIONS

American Institute of Electrical Engineers Manuscript paper No. 55-730.

Primary Examiner—R. J. Hickey
Attorney, Agent, or Firm—Yount & Tarolli

[57] ABSTRACT

The alternator has a stator (12) with a rotor (10) mounted for rotation therein. The armature and field windings (20, 22, 24; 18) are both carried on the stator. The rotor is mechanically driven so as to rotate within the stator. Both the rotor and stator have poles (14; 16) formed at regular spacings on facing surfaces thereof so that as the rotor is rotated, rotor poles rotate past the field poles which are formed on the stator. The rotor poles are regularly spaced about the rotor such that at certain rotor positions all rotor poles are opposed to alternate field poles. Field coils (18a, 18b) are provided, each wound about a corresponding one of the field poles. An excitation circuit (FIG. 4) applies an excitation potential to the field coils such that field coils about adjacent field poles produce oppositely directed magnetic fields. The polarity of the this excitation potential is reversed each time the rotor poles become opposed to alternate field poles. As the rotor rotates, the rotor poles alternately complete and break magnetic field paths between adjacent field poles. Armature coils (20a, 20b, 22b, 24a, 24b) are also provided, each wound about a portion of a corresponding field pole to provide induced voltages as a result of the completing and breaking of the magnetic field paths by the rotor poles. Since the rotor may be constructed entirely free of windings, the need for coupling electrical energy into or out of the rotor is eliminated.

13 Claims, 8 Drawing Figures

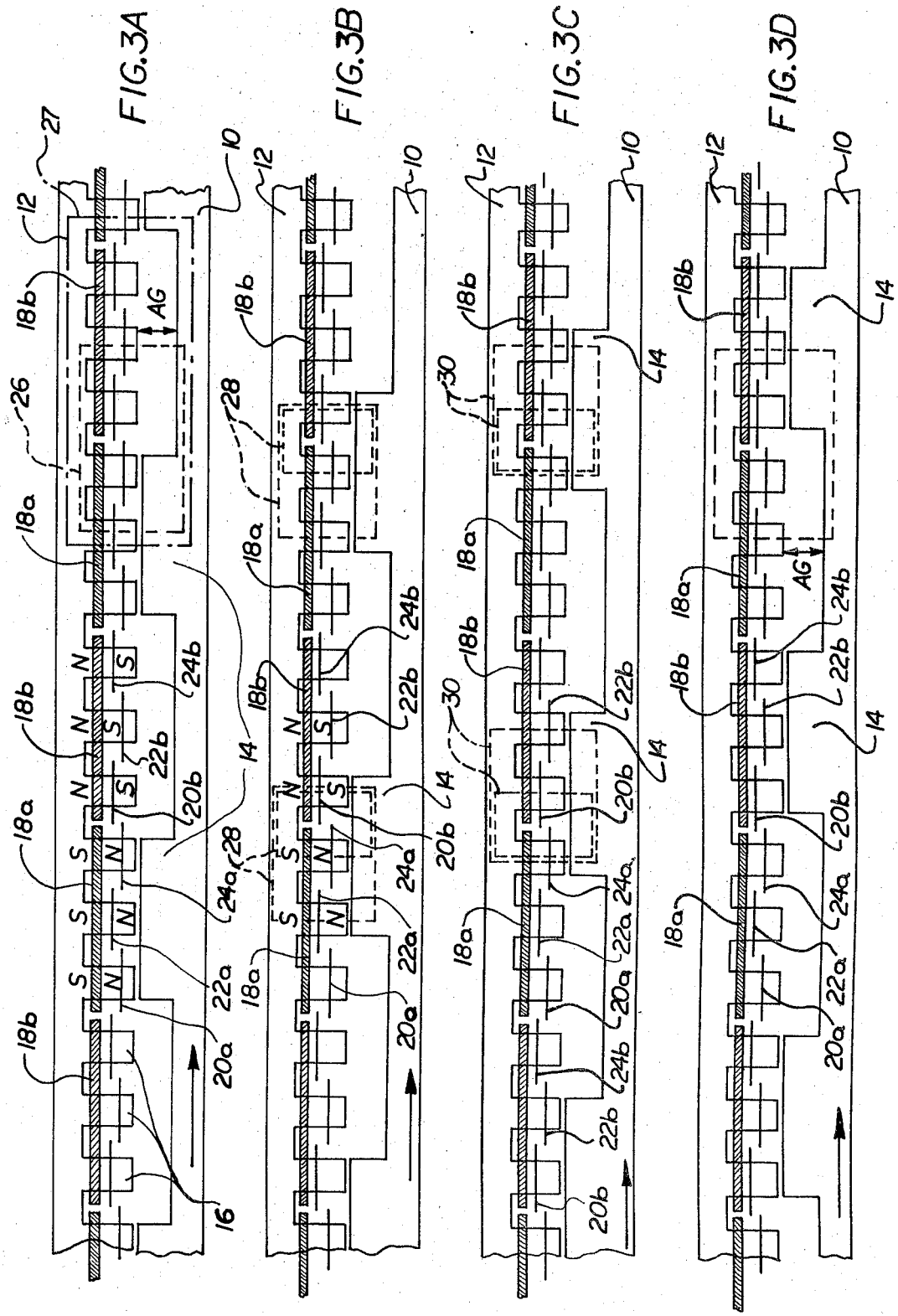

ALTERNATOR HAVING STATOR CARRYING BOTH FIELD AND ARMATURE WINDINGS

BACKGROUND AND FIELD OF THE INVENTION

The present invention relates to alternators, and more particularly to an alternator designed such that the stator carries both field and armature windings.

As with rotating electric motors, alternators include two major mechanical parts; the stationary part, referred to as the stator, and a part which rotates on bearings within the stator, called the rotor. In conventional alternator design, both the rotor and the stator carry windings. The rotor is mechanically driven by an external machine, for example an internal combustion engine, and one of the windings (the field winding) is energized. This induces a voltage in the other winding (the armature winding), which can be rectified and used as the source of electric potential for charging a battery, for example.

Since, except in permanent magnet electrodynamic machines, the rotor will normally carry a winding, some means must be provided for coupling electrical power into or out of this winding. To accomplish this, the rotor normally carries slip rings which are contacted by stationary brushes. These brushes and slip rings are one of the major trouble points in an alternator, since they can be fouled by grease, dirt, etc. and because they are prone to wear. It would clearly be desirable to devise an alternator which did not require the inclusion of windings on the rotor, thereby avoiding the need for the brushes and their associated slip rings, or any other means for coupling electrical power into or out of the rotor.

Alternators having windingless rotors have been devised in the past, and are disclosed in the following U.S. Pat. Nos. 3,157,810; 3,173,076; 3,512,026; and 4,075,521.

SUMMARY OF THE INVENTION

There is described herein an alternator wherein both armature and field windings are carried on the stator, thereby eliminating the need to place a winding upon the rotor. The resulting elimination of the brushes and slip rings or other means of coupling power into the rotor enhances the reliability of the alternator. In addition, a particular field pole/rotor pole arrangement is utilized to enhance the efficiency and power output of the alternator.

To accomplish this, an alternator is provided having a rotor and a stator, each of which has a plurality of poles formed on their respectively facing surfaces such that as the rotor is rotated, the rotor poles rotate past the field poles which are carried on the stator. The rotor poles are spaced around the rotor such that at certain rotational positions all rotor poles are opposed to alternate field poles. The individual coils which together make up the field winding are each wound about a corresponding field pole, and means are included for applying an excitation potential to these coils so that adjacent coils produce oppositely directed magnetic fields. As the driven rotor rotates, the rotor poles sequentially complete and break magnetic field paths between adjacent field coils. The armature coils which collectively represent the armature winding are also each wound about at least a portion of a field pole for developing induced voltages as a result of the completing and breaking of the magnetic field paths as the rotor is rotated.

In the described embodiment, the DC potential applied to the field coils is reversed each time the rotor poles become directly opposed to the field poles. Means are provided attached to the rotor for indicating when this alignment occurs.

BRIEF DESCRIPTION OF THE DRAWINGS

The foregoing and other aspects and advantages of the present invention will become more readily apparent from the following detailed description, as taken in conjunction with the accompanying drawings, wherein:

FIGS. 3A-3D are schematic representations of the rotor and stator poles of the alternators of FIGS. 1 and 2 in a linear configuration;

DETAILED DESCRIPTION

Figure 1:
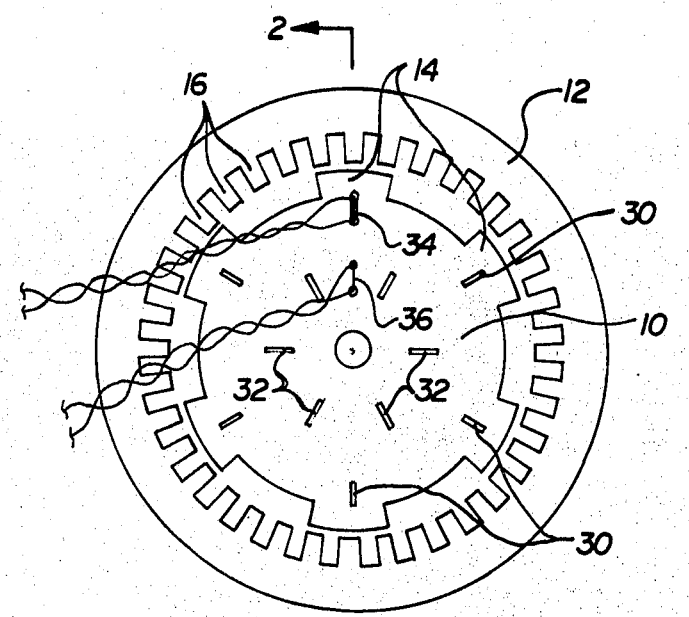
FIG. 1 is a front elevational view of the rotor and stator of an alternator in accordance with the teachings of the present invention.
Figure 2:
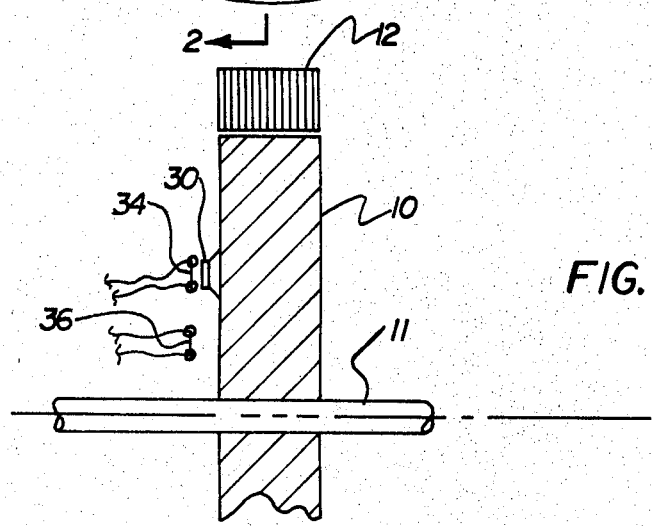
FIG. 2 is a section taken along lines 2—2 of the alternator of FIG. 1.

FIGS. 1 and 2 illustrate an alternator including a rotor 10 and its accompanying stator 12. This stator will be fixedly mounted within a housing (not shown). The rotor 10 is mounted on an axle 11 which is journaled within the same housing so as to rotate relative to the stator.

The rotor 10 has a number of circumferentially spaced poles 14 formed therein, with a circumferential distance between adjacent poles being approximately equal to the circumferential length of each pole. The rotor carries no windings.

The stator 12 also has a number of poles 16 formed therein, with the poles being dimensioned so there are six times as many poles on the stator as on the rotor. Both field and armature windings are wound about the stator poles; the field winding to provide the electromagnetic field, and the armature windings to provide a three phase AC output from the alternator. These windings are not illustrated in FIGS. 1 and 2, but will be described in detail hereinafter with reference to FIG. 3.

FIGS. 3A-3D illustrate various orientations of the rotor 10 relative to the stator 12. For convenience of illustration, both rotor and stator are shown as formed linearly, rather than along a circumference. It will be appreciated, however, that in an actual alternator the rotor and stator are each curved as shown in FIGS. 1 and 2.

The individual coils of the field winding are indicated in FIG. 3A by the hashed portions 18a, 18b. As can be seen in FIG. 3A, these field coils 18a, 18b are each wound about a corresponding field pole, represented by three of the stator poles. Thus, each of these groups of three stator poles represents a single field pole. In the described embodiment the adjacent field coils 18a and 18b are connected in series, but are wound about their respective field poles in opposite senses so that the magnetic flux through adjacent field coils are opposingly oriented. Of course, a wide variety of different winding designs are known in the art and any such known design can be used herein so long as the resulting magnetic flux through adjacent field coils is opposingly oriented.

The three phases of the armature windings, on the other hand, are indicated in FIGS. 3A–3D by reference numerals 20, 22, and 24. As schematically represented in FIG. 3, each of the coils 20a, 20b, 22a, 22b and 24a, 24b of these three armature windings is wound about a corresponding individual stator poles, i.e., different phases are wound about different portions of the field poles. The several coils of each phase are all interconnected in series, with the winding directions of coils (e.g., 20a, 20b) of the same phase but on adjacent field poles being wound about the stator poles in opposing senses. The three phases may be connected together in a conventional wye or delta arrangement.

With electrical power being applied to the field winding in one sense, the polarity of the magnetic field produced thereby will be as indicated by the N's and S's in FIG. 3A, which respectively represent north and south magnetic poles. The polarity of the magnetic field reverses from one field coil 18a to the next 18b because of the opposing directions in which adjacent coils are wound.

Figure 5:
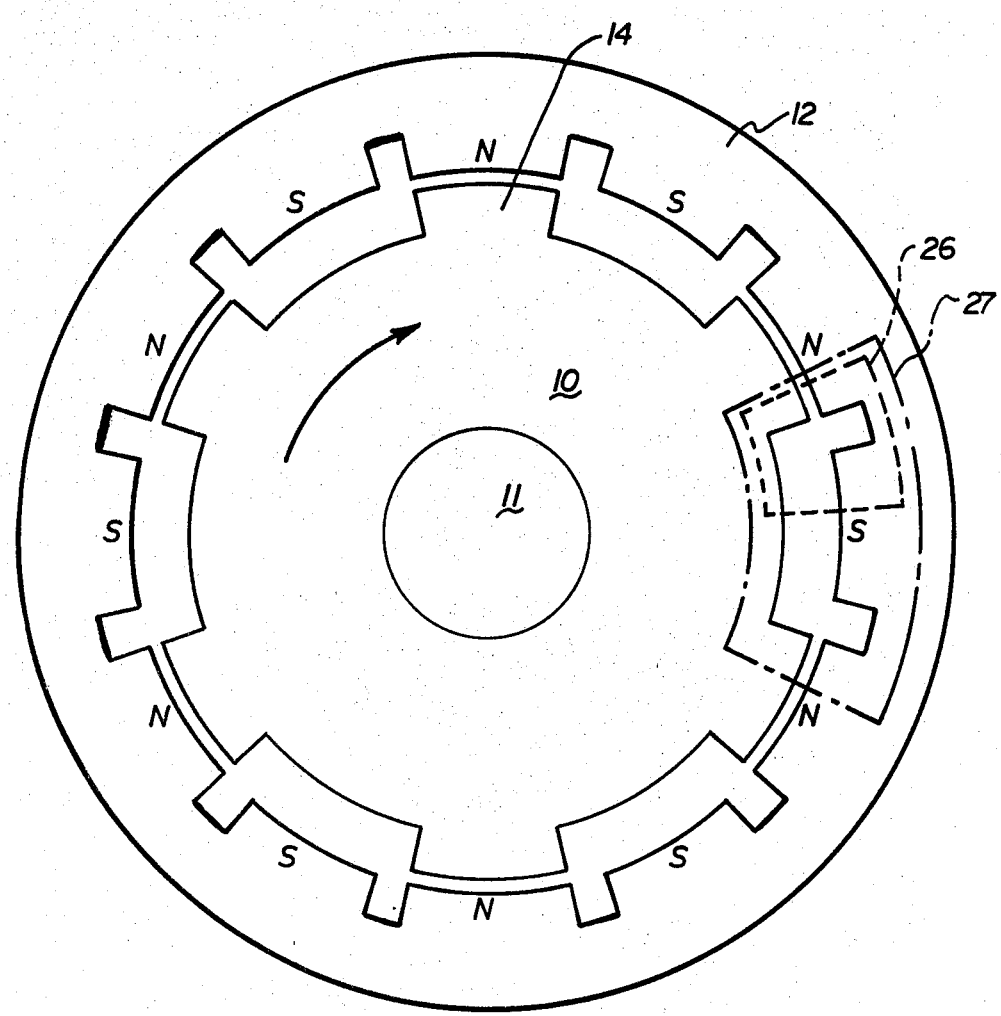
FIG. 5 is a simplified schematic representation of the alternator of FIG. 1.

Since there are only half as many rotor poles as field poles, the rotor poles are located at angular spacings corresponding to twice the angular spacing between one field pole and the corresponding portion of the next adjacent field pole. Consequently, during rotor movement the rotor poles will periodically all be opposed to alternate field poles. This is perhaps best seen in FIG. 5, which is a simplified illustration showing the stator poles consolidated into unitary field poles and omitting the field and armature windings.

With the rotor positioned relative to the stator as shown in FIG. 3A (and in FIG. 5), each of the rotor poles is positioned under a single corresponding field pole, in this case the north magnetic poles. Consequently, the flux path 26 between adjacent field coils 18a and 18b includes a substantial air gap AG, introducing significant reluctance into the magnetic circuit. The magnetic flux between adjacent field poles will therefore be very low. Although the rotor poles then form low reluctance flux paths 27 between alternate field poles, negligible flux will be developed along those paths since alternate field poles are of the same magnetic polarity. Upon rotor movement the magnitude of the magnetic flux in the stator poles will change, in turn inducing voltages in the three phases of AC windings 20, 22 and 24.

As the rotor rotates relative to the stator, the rotor will consecutively reach the positions relative to the stator indicated in FIGS. 3B, 3C and 3D. In FIG. 3B, the rotor has rotated to the point where the rotor poles now span adjacent field poles and are located beneath the stator poles associated with armature coils 22a, 24a and 20b. This establishes a low reluctance magnetic flux path between the adjacent field coils 18a and 18b through the stator poles associated with armature coils 22a, 24a and 20b. This flux path is indicated by dotted lines 28 in FIG. 3B. It will be noted that the amount of flux passing through coils 22a, 24a and 20b has changed from the substantially zero level of FIG. 3A to a much higher level, due to the change in the reluctance of the magnetic circuit including these poles.

As the rotor rotates still further, it reaches the position indicated in FIG. 3C, wherein the rotor poles are located beneath the stator poles associated with armature coils 24a, 20b, and 22b. In this situation, as with the FIG. 3B situation, a low reluctance flux path exists between the field coils 18a and 18b, in this case through the stator poles associated with armature coils 24a, 20b, and 22b. In this situation the flux through armature coil 22a has diminished to zero, the flux in armature coil 24a has doubled, the flux in armature coil 20b has diminished, and the flux in armature coil 22b has increased.

As the rotor rotates still further, reaching the position indicated in FIG. 3D, the situation again exists wherein the rotor poles are each located under a similar field pole, i.e., under stator poles of the same magnetic polarity. Thus, in this situation substantially no flux will pass between adjacent field coils, and all of the magnetic circuits are broken. It is at this point that the polarity of the voltage applied to the field winding 18 is reversed, thereby causing the polarity of the magnetic fields in the field coils to reverse. Upon this reversal, the FIG. 3D orientation becomes equivalent to the FIG. 3A orientation, and hence further rotation of the rotor will produce changing flux densities in the various poles as described previously.

Stated differently, as the rotor rotates it alternately makes and breaks magnetic field paths between adjacent field coils 18a and 18b, thereby varying the magnitude of the magnetic flux which passes through the field poles and thus through the three phases of armature coils. The variation in flux density induces voltages across the three phase armature windings 20, 22 and 24, which may then be rectified and used to power output devices in any conventional manner.

In the operation of the alternator as it has been described with respect to FIGS. 3A to 3D, it will be noted that the flux always passes through the rotor poles 14 in the same direction. In the embodiment described, for example, the rotor poles are always moving from north magnetic poles toward south magnetic poles. Because the magnetic flux direction remains fixed, the magnetizing losses in the rotor are substantially reduced and the rotor poles can therefore be solid instead of laminated. Furthermore, the rotor poles 14, if not energized, will become slightly magnetized. This magnetism, known as remnant magnetism, is desirable because it allows the alternator to build up to full output without external energizing means.

As brought out above, in the embodiment described the polarity of the potential applied to the field winding is reversed each time the rotor poles become aligned with the field poles on the stator. The circuitry which accomplishes this reversing of excitation potential includes two elements; the sensor for sensing the position of the rotor and the circuitry which accomplishes the actual reversal of polarity of the DC potential applied to the field winding.

The sensor which is used in the described embodiment to sense the rotation of the rotor through the prescribed angular increments includes a number of magnets affixed to the rotor at selected positions, together with means for sensing the passage of the magnets past a specific location relative to the stator. As can be seen in FIG. 1, the magnets are located in two radial positions on the rotor. The magnets 30, each of which is positioned at the same circumferential location as the center line of a corresponding one of the rotor poles 14, are located at a radial location which is quite near the periphery of the rotor 10. The second set of magnets 32, each of which is circumferentially aligned with the center line of the space between adjacent rotor poles 14, are located at a radial position which is inward from the position at which the magnets 30 are located. The reason for locating the two sets of magnets at different radial distances from the axle 11 is to provide a means of uniquely identifying the positions of the rotor relative to a specific set of the field coils (18a or 18b) wound upon the stator 12. The polarity reversing circuit uses this uniqueness to insure that the direction of the flux passing through the rotor poles will always be the same at start up of the alternator.

Attached to the housing, and thus fixed relative to the stator 12, are two sensors 34 and 36. In the embodiment being described these sensors 34 and 36 are aligned at a common circumferential location corresponding to the center line of a field pole. The two sensors 34 and 36 are fixed at radial locations corresponding to the radial locations of the magnets 30 and 32, so that each of the sensors 34 and 36 senses the passage of a corresponding set of magnets 30 and 32, respectively.

In a preferred embodiment, the sensors comprise a specially treated wire, known as Wiegand wire, surrounded by a copper wire sensing coil. The nature and operation of this Wiegand sensing module is described on pages 44-48 of the February, 1978 issue of "Automotive Engineering." When one of the magnets 30 or 32 passes its corresponding Wiegand wire module, a sharp, well defined voltage pulse will be induced in the sensing coil surrounding the Wiegand wire.

Figure 4:
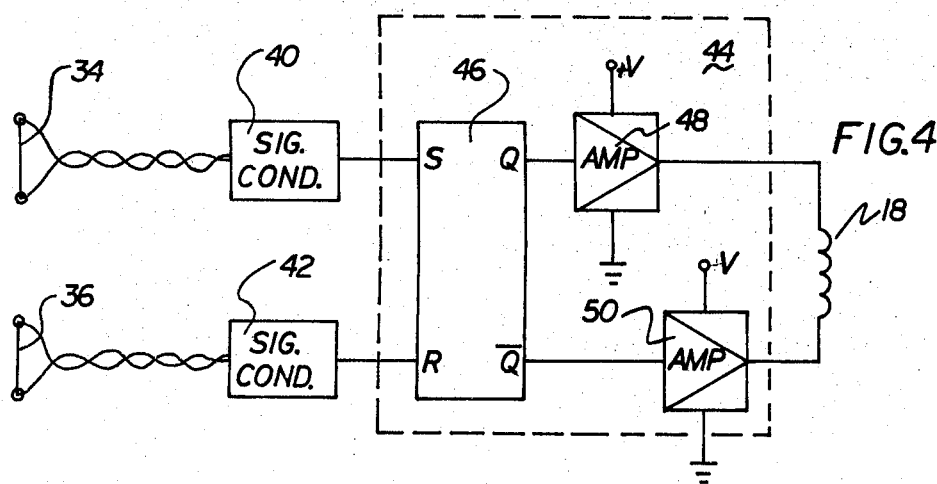
FIG. 4 is a block diagram of a control system for changing the polarity of the potential applied to the field winding upon the appropriate movement of the rotor relative to the stator.

As can be best seen in FIG. 4, the outputs of the sensing coils of the two Wiegand wire modules 34 and 36 are provided to corresponding signal conditioning circuits 40 and 42. Since the output of the Wiegand wire modules comprises a very well defined pulse having an amplitude which may be designed to be as high as ten volts, in many instances it will be possible to eliminate the signal conditioning circuits 40 and 42 completely, instead connecting the output of the Wiegand wire module directly to the corresponding input of the excitation supply circuit 44.

The outputs of signal conditioning circuits 40 and 42 are respectively connected to the SET and RESET inputs of a bi-stable flip-flop 46. The flip-flop 46 has two outputs, Q and Q̄, which always carry voltage levels which are the inverse of one another. Thus, if the Q output is at a high logic level (+12 Volts, for example) then the Q̄ output will be at a low logic level (ground potential). When a voltage pulse is applied to the SET input to flip-flop 46, the bi-stable will assume a state in which the Q output is at a high logic level and the Q̄ output is at a low logic level. When a voltage pulse is applied to the RESET input to flip-flop 46, however, the outputs will assume the alternate states; i.e., the Q output will be at a low logic level and the Q̄ output will be at a high logic level.

These output signals are amplified by corresponding amplifiers 48 and 50, whose outputs are each connected to a corresponding end of the field winding 18. Since at any given time the output of one of amplifiers 48 and 50 will be high while the other is low, a voltage difference corresponding to the difference between the high and low voltages will always be applied across the field winding 18. As the sensing modules 34 and 36 pass the various magnets 30 and 32, however, the polarity of this voltage will change.

Thus, when the sensing module 34 senses the movement of a magnet 30 therepast, the potential applied across field winding 18 will be in a first direction. When, shortly thereafter, the module 36 senses the passage of a magnet 32 therepast, the flip-flop 46 will change states, causing the polarity of the voltage applied across winding 18 to reverse. The voltage polarity will continue reversing in this fashion as the magnets 30 and 32 pass the corresponding sensing modules 34 and 36.

The alternator described would operate adequately if only a single sensing module 34 were provided, and the magnets 32 were moved radially outward so as to occupy radial locations similar to those of magnets 30. In this event, the SET/RESET flip-flop 46 would be replaced by a toggle flip-flop, which changed from one state to the next with each voltage pulse applied at the input thereof from the sensing module. A disadvantage of this approach would be that the polarity of the potential applied across field winding 18 would not be uniquely determined relative to the two directions of field coils 18a and 18b. This could hinder the development of remnance magnetism in the rotor poles.

With the excitation coil supply circuit illustrated in FIG. 4, the potential applied to the field winding will not only periodically reverse polarity as the rotor rotates, but will always be of the same polarity when the poles are aligned under a given one of the field coils 18a or 18b. Thus, each time the alternator is brought into operation, the flux passing through the poles 14 will be in the same direction, enhancing the remnant magnetism. This might not be the case if a circuit were employed which did not differentiate between those magnets which were underneath rotor poles and those which were not.

An alternator without any windings on the rotor has been disclosed. In addition to the absence of brushes, a number of other advantages inhere in the design which has been described. For example, the flux path through the rotor is entirely contained within the poles 14. Since the magnetic field essentially never leaves the pole pieces, a massive hub is not necessary. The hub may, in fact, be constructed of a low permeability material, contrary to previous designs. Furthermore, since the magnetic path, in general, passes simply between one field coil and the next, the magnetic path is very short. Another advantage is that the reversing of the field current requires very little energy since at the time of reversal the rotor poles 14 are all in a low flux position. Moreover, as described above, the rotor poles are magnetized in just one direction so that remnant magnetism is created, helping to reduce the alternator build up speed.

Although the invention has been described with respect to a preferred embodiment, it will be appreciated that many variations and alterations of the described concepts are within the comprehension of the invention. For example, the system for sensing the rotational position of the rotor may be of many different types including electric, magnetic, optical, or even mechanical systems. The many different varieties of electronic distributor circuits which are used with internal combustion engines will, in general, all be useful here as well.

In addition, although in the described design the field poles are split into three stator poles, with each of the stator poles being surrounded by a separate phase of armature coil, it will be appreciated that the number of stator poles into which each field pole is separated, and the number of AC output phases, is a matter of design choice. Of course, many other changes may also be made without departing from the spirit and scope of the invention, as defined in the appended claims.

What is claimed is:

1. An alternator comprising:
   a stator;
   a rotor mounted for rotation within said stator, said rotor being adapted to be mechanically driven so as to rotate;
   said rotor and stator respectively having rotor and field poles formed at regularly spaced angular locations on facing surfaces thereof such that, as said rotor is rotated, the rotor poles on the rotor rotate past the field poles on the stator, said rotor poles being spaced about the rotor such that at certain rotational positions all rotor poles are opposed to alternate field poles;
   field coils, each wound about a corresponding one of said field poles;
   means for applying an excitation potential to said field coils such that field coils wound about adjacent field poles produce oppositely directed magnetic fields, whereby as said rotor rotates said rotor poles alternately complete and break magnetic field paths between adjacent field poles; and
   armature coils each wound about at least a portion of a corresponding one of said field poles for providing induced voltages as a result of said completing and breaking of said magnetic field paths.

2. An alternator as set forth in claim 1, wherein said excitation potential applying means comprises potential supply means for applying a potential of substantially constant magnitude across said field coils, said potential supply means being triggerable to reverse the polarity of said potential, and trigger means for triggering said potential supply means to reverse said potential polarity whenever said rotor and stator pass through selected relative positions.

3. An alternator as set forth in claim 2, wherein said trigger means comprises means for triggering said potential supply means whenever said rotor poles are opposed to alternate field poles.

4. An alternator as set forth in claim 1, wherein each said field pole is split into plural stator poles, and wherein said armature coils include at least first and second phase coils associated with each of said field poles, each of said first and second phase armature coils being wound about at least a selected one of said plurality of stator poles of the associated said field pole.

5. An alternator as set forth in claim 1, wherein said field coils are connected together in series and field coils disposed about adjacent field poles are wound in opposing directions, and wherein said excitation potential applying means comprises means for applying said potential across said series connected field coils, said oppositely directed magnetic fields being produced due to the opposing winding directions of adjacent field coils.

6. An alternator as set forth in claim 1, wherein at least some of said armature coils are connected together in series, with armature coils associated with adjacent field poles being wound in opposing directions and with those associated with alternate field poles being wound in the same direction.

7. Apparatus for generating electricity, comprising rotor means and stator means disposed adjacent one another and having rotor and field poles, respectively, formed of the facing surfaces thereof, said rotor means and stator means being adapted to be relatively moved so that said rotor poles move past said field poles with the rotor poles being spaced apart such that at certain relative orientations of said rotor means and stator means said rotor poles are all opposed to alternate field poles, means for generating opposingly directed magnetic fields in adjacent field poles whereby said rotor poles alternately complete and break the magnetic field path between said adjacent field poles upon relative movement between said stator means and said rotor means, and armature coils each wound about at least a portion of a corresponding field pole for providing induced voltages as a result of said completing and breaking of said magnetic field path.

8. Apparatus as set forth in claim 7, wherein said magnetic field generating means comprises at least two field coils, each wound about a corresponding one of said adjacent field poles, and means for applying an excitation potential to said field coils such that said field coils produced oppositely directed magnetic fields within said adjacent field poles.

9. Apparatus as set forth in claim 8, wherein said field coils are connected together in series but are wound about their corresponding field poles in opposite directions, and wherein said excitation potential applying means comprises means for applying an excitation potential across said series connected field coils, said oppositely directed magnetic fields being produced due to the opposite winding directions of said coils.

10. Apparatus as set forth in claim 9, wherein said excitation potential applying means comprises means for applying said excitation potential and for reversing the polarity of said potential whenever said rotor means and stator means assume certain relative orientations.

11. Apparatus as set forth in claim 8, wherein each said field pole is split into a plurality of said stator poles.

12. Apparatus as set forth in claim 11, wherein said armature coils include at least first and second phase coils associated with each of said field coils, each of said first and second phase armature coils being wound about at least a corresponding selected one of said plurality of stator poles into which each of said field poles is split.

13. Apparatus as set forth in claim 1, wherein said means for applying said excitation potential to said field coils comprises means for applying said excitation potential to said field coils such that the currents passing through the field coils of adjacent field poles flow in opposing directions about their respective field poles.

* * * * *